United States Patent [19]

Oosterling et al.

[11] 4,240,245
[45] Dec. 23, 1980

[54] DEVICE FOR BALING CUT CROPS

[75] Inventors: Pieter A. Oosterling, Nieuw-Vennep; Adriaan Van Zweeden, Rijsenhout, both of Netherlands

[73] Assignee: Expert N.V., Curacao, Netherlands Antilles

[21] Appl. No.: 921,218

[22] Filed: Jul. 3, 1978

Related U.S. Application Data

[63] Continuation of Ser. No. 738,683, Nov. 4, 1976, abandoned.

[30] Foreign Application Priority Data

Nov. 5, 1975 [NL] Netherlands ............... 7512991

[51] Int. Cl.³ ............... A01D 39/00; B30B 1/18; B30B 7/04
[52] U.S. Cl. ............... 56/341; 56/343; 100/9; 100/100; 100/189; 100/215; 100/218; 100/232; 100/290; 100/295; 100/98 R
[58] Field of Search ............... 56/341, 342, 343, 344; 100/9, 100, 188 R, 189, 240, 245, 141, 142, 143, 179, 98 R, 215, 232, 218, 290, 295

[56] References Cited

U.S. PATENT DOCUMENTS

| 47,591 | 5/1865 | Wilber | 100/290 |
| 2,552,888 | 5/1951 | Druetta | 100/189 |
| 2,591,970 | 4/1952 | Seegers | 100/98 R |
| 2,984,172 | 5/1961 | Roberts | 100/218 |
| 3,217,461 | 11/1965 | Wheelock | 100/9 |
| 3,426,672 | 2/1969 | Nolt | 100/218 |
| 3,552,109 | 1/1971 | Murray | 56/343 |
| 3,762,311 | 10/1973 | Friedman | 100/232 |
| 3,827,349 | 8/1974 | Gilman | 100/98 R |

FOREIGN PATENT DOCUMENTS

| 119916 | 5/1901 | Fed. Rep. of Germany | 100/9 |
| 1233688 | 10/1960 | France | 100/179 |

*Primary Examiner*—Billy J. Wilhite
*Attorney, Agent, or Firm*—Diller, Ramik & Wight

[57] ABSTRACT

A device for baling cut crop, comprising a baling chamber having an inlet port and an outlet port and a compression member adapted to move in the baling chamber, the compressing stroke of the compression member extends along the inlet port to near the outlet port and is equal to or slightly larger than the distance between the inlet and outlet ports; a construction of the device according to the invention is suitable for making bundles having a materially higher "specific weight" than the generally known "straw bales".

14 Claims, 9 Drawing Figures

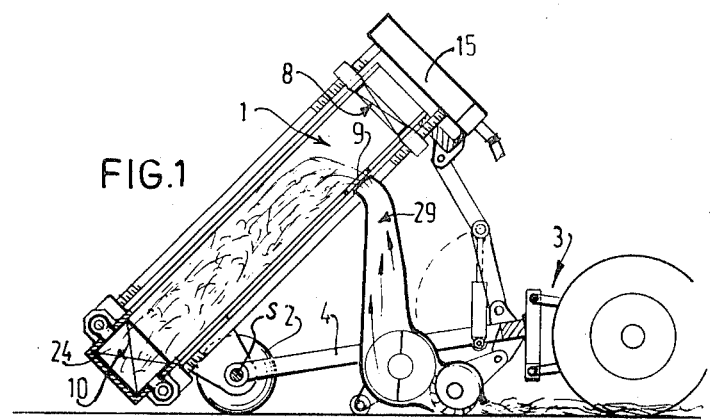
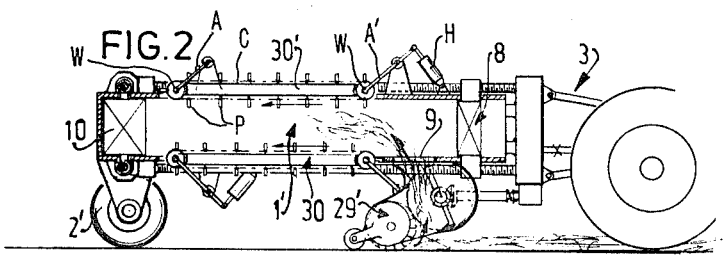
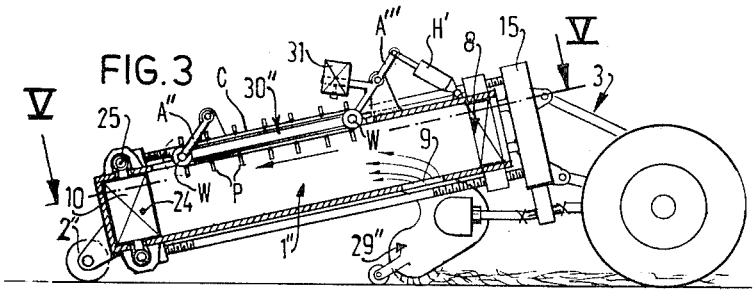
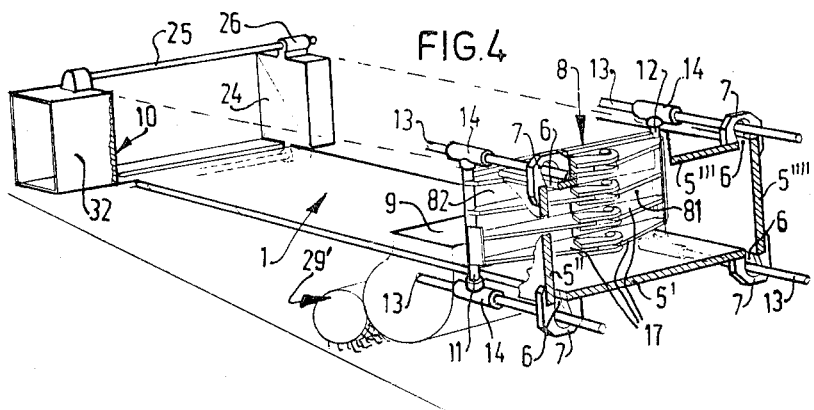

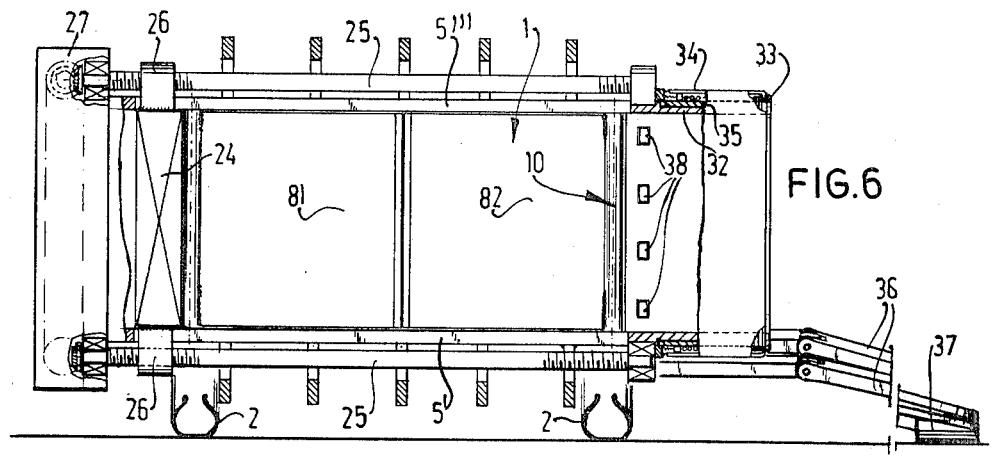
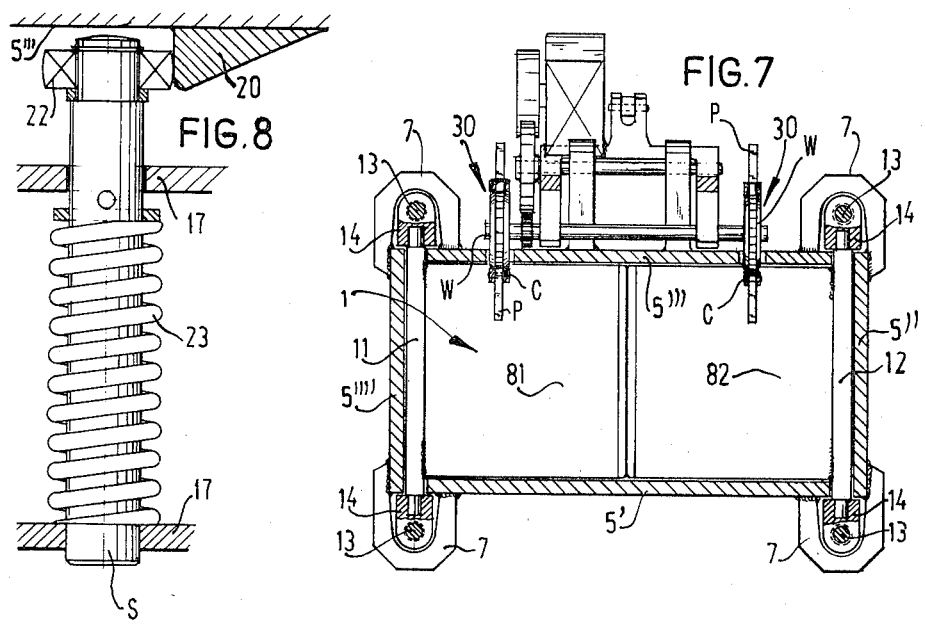
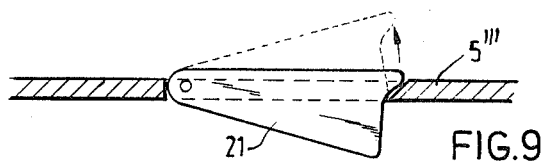

DEVICE FOR BALING CUT CROPS

This is a continuation, of application Ser. No. 738,683 filed Nov. 4, 1976, now abandoned.

The invention relates to a device for baling cut crop, particularly grass, comprising a baling chamber having an inlet port and an outlet port and a compression member adapted to move in the baling chamber.

The invention has for its object to provide a construction of the device of the kind set forth such that it is suitable for making bundles having a materially higher "specific weight" than the generally known "straw bales".

In order to obtain such a strongly compressed bale it is necessary to insert a comparatively large quantity of loose crop into the baling chamber, the crop being subsequently densified by a single stroke of the compression member.

The invention provides a device of the kind mentioned above, which is distinguished in that the compressing stroke of the compression member extends along the inlet port to near the outlet port and is equal to or slightly larger than the distance between the inlet and outlet ports.

The method according to the invention permits of filling in advance the whole baling chamber with cut crop until a predetermined degree of filling is reached, the compression member then moving along the inlet port to densify the complete contents of the baling chamber until the compression member approaches the outlet port.

According to a further development of the principle of the invention it is advantageous to provide the delivery port in a sidewall of the baling chamber, viewed in the direction of compression, and to terminate the compressing stroke of the compression member at the edge of the delivery port facing the inlet port. Since the highest densifying forces are orientated in the direction of compression, the constructure of the delivery port may be comparatively light.

When the pressing face of the compression member is defined by the sahpe of said edge, the compression member together with the sidewalls of the remaining part of the baling chamber can form a channel at the terminal position of the compressing stroke, through which an ejecting member can be operative, which can push a compressed bale of crop at right angles to the direction of compression through the outlet port in the sidewall of the baling chamber.

In order to ensure a smooth circumferential shape of the bale it is advisable to make the periphery of the plate-shaped compression member substantially join the inner wall of the compression chamber. It is advantageous to design that portion of the peripheral rim of the compression member which moves along the inlet port provided in the sidewall of the baling chamber so as to be suitable for co-opration with the edge of the inlet port facing the outlet port so that a scissor-like effect is obtained. This has the advantage that any long stalks or stems are cut during the initiation of the densification.

In order to ensure a continuous introduction of crop, that is to say, during the operation of the compression member and during the compressing stroke beyond the inlet port, the invention proposes to construct the compression member so as to be pivotable about a spindle at right angles to the direction of compression so that after the compression of a bale and during the withdrawal of the compression member this member brushes the new quantity of crop inserted into the baling chamber.

In the case of baling chambers of large cross-section it is preferred to construct the compression member in the form of two or more pivotable portions, each portion being pivotable about a spindle extending at right angles the direction of compression.

The compression member can be directly fastened to a piston rod, which is reciprocated by a hydraulic cylinder or the like. In the case of large stroke length, however, the invention proposes to provide one or more slot-shaped openings in the wall of the baling chamber, through which driving means can be passed for direct action on the compression member.

In order to carry out a given degree of pre-densification so that a larger quantity of crop can be compressed into a bale, it is preferred to arrange auxiliary transport means in the baling chamber, which means convey crop inserted into the baling chamber through the inlet port towards the outlet port. In an embodiment in which the compression member engages the sidewall of the baling chamber it is preferred to withdraw these auxiliary conveying means from the baling chamber prior to the actuation of the compression member.

Finally the invention proposes to provide the baling device with binding means, which envelop a compressed bale of crop in a tape or twine of flexible material so that the bale maintains its compressed shape. In a particular embodiment of the invention previously binding material is formed into an endless belt and to the bale during its emergence from the outlet port at intervals around the same, after which due to the expansion of the compressed crop the bale is tightly held in the endless tape.

The invention will be described more fully hereinafter with reference to a few embodiments. In the drawing:

FIGS. 1, 2 and 3 show three embodiments of the baling device in accordance with the invention, FIG. 4 is a schematic, perspective view of the main component parts of the baling device in the embodiments shown in the preceding Figures.

FIG. 6 is a sectional view taken on the line VI—VI in FIG. 5.

FIG. 7 is a sectional view taken on the line VII—VII in FIG. 5.

FIG. 8 is an elevational view of a detail of the guide means for causing the compression member to pivot taken on the line VIII—VIII in FIG. 5.

FIG. 9 is an elevational view of a further detail of the guide means for causing the compression member to pivot taken on the line IX—IX in FIG. 5.

Figure 5:
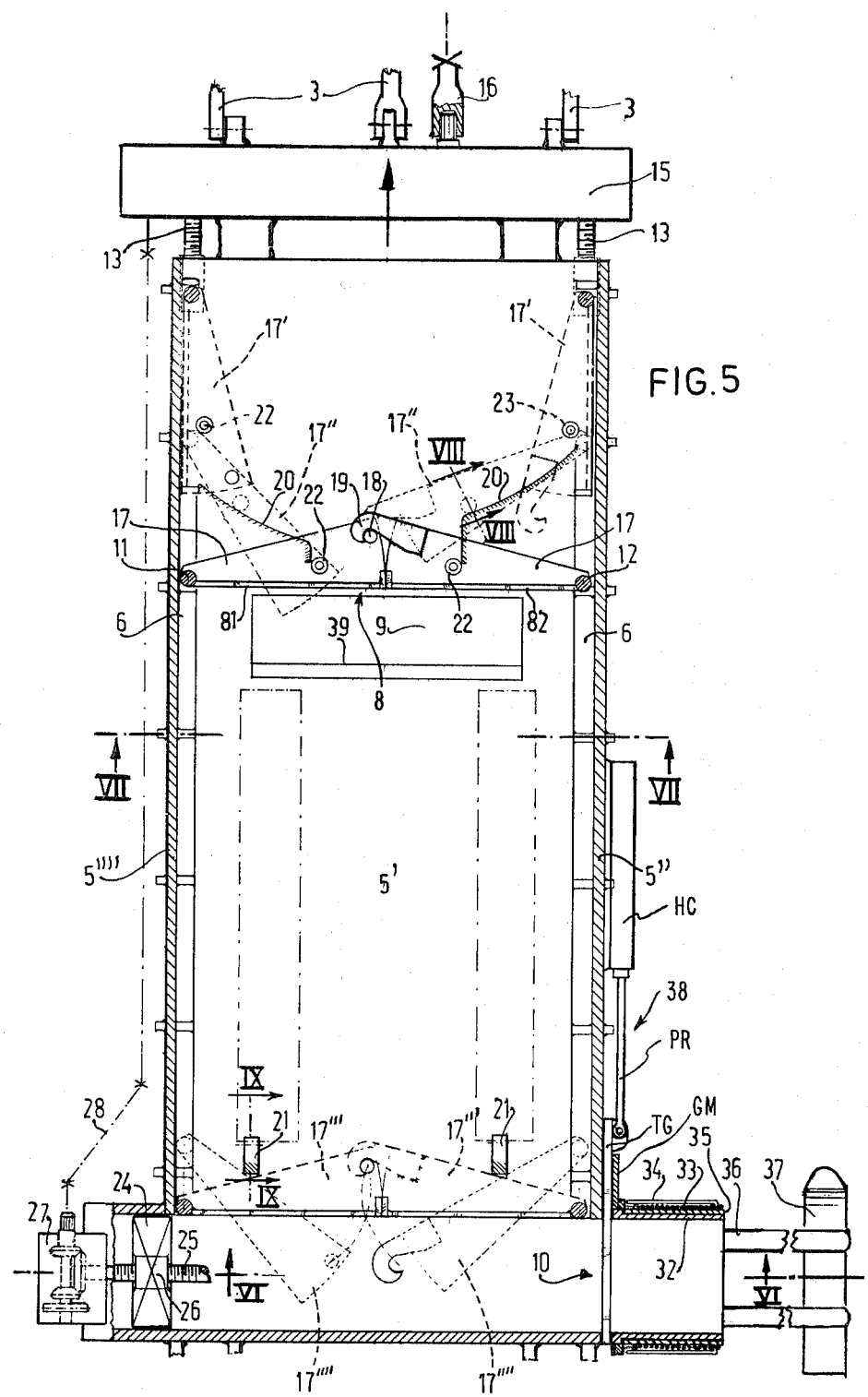
FIG. 5 is partly a sectional view and partly an elevational view taken on the line V—V in FIG. 3.

The embodiments shown in the Figures all comprise mainly a baling chamber, 1' or 1" having a predetermined length and a rectangular cross-section. The baling chamber may be self-supporting and be directly supported from ground wheels 2, 2' or 2" on the rear side and by the three-point hitch 3 of an agricultural tractor, only the back wheel of which is shown at the front (see FIGS. 2 and 3). As an alternative the baling chamber may be suppported from an auxiliary frame 4 as illustrated in FIG. 1. In each embodiment, the baling chamber comprises four sidewall sheets 5', 5", 5.'. extending in the direction of length of the baling chamber as shown in FIG. 4. The side edges of the wall sheets do not join one another, but leave a gap so that a slot-shaped opening 6 extending in the direction of length is left along the four corners of the baling chamber (see FIGS. 4 and 5). The wall sheets are interconnected by bracket-shaped connectors 7 illustrated in FIGS. 4 and 7 to provide the slots 6.

In each baling chamber a compression member 8 is adapted to move in the direction of length in a manner such that it performs a compression stroke along the inlet port 9 in the bottom wall 5' up to the outlet port 10 in the wall 5''. Each compression member 8 has substantially the shape of a plate and the circumferential edge engages the inner wall of the baling chamber. In the embodiment illustrated in FIGS. 4 to 7 the compression member 8 comprises two panels 81 and 82 adapted to pivot each about a spindle 11 and 12 respectively at right angles to the direction of compression; the pivotal movement will be explained more fully hereinafter.

In the embodiments shown the compression member 8 is driven through a screw spindle 13 extending externally of the baling chamber along each slot 6 i.e. in the embodiments shown four screw spindles near the corners of the baling chamber, along which screw spindle 13 an element 14 is displaceable as a result of the rotation of the screw spindle. Each element 14 serves as a carrier for the end of the pivotal shaft 11 and 12 respectively. The screw spindles 13 are synchronously driven via a transmission gear 15 by the power take-off shaft 16 of the agricultural tractor. From the foregoing it will be apparent that upon a synchronous rotation of the screw spindles 13 the elements 14 will move relatively synchronously along the slot-shaped openings 6, catching along the pivotal shaft 11 and 12 respectively and hence also the compression member 8.

The compression member 8 shown in FIGS. 4 to 7 comprises two pivotable partitions 81 and 82, which are controlled by guide means 20,21 arranged in the wall portion 5''' of the baling chamber 1 in a manner such that during the compression stroke towards the outlet port 10 the compression member 8 occupies the position indicated by solid lines indicated at 17, 17, 81 and 82 in FIG. 5. The positions of the partitions at the beginning at the beginning of the compression stroke are indicated by the dashed lines at 17', 17' and an intermediate position, prior to reaching the illustrated full line positions, is illustrated at 17'', 17''. This operative position is retained until the completion of the compression stroke indicated at, 17''',17'''. During the return stroke towards the inlet port 9, however, the partitions 81 and 82 can turn about the pivotal shafts 11 and 12 under the control of the guide means 21,21 and move away from one another as indicated by the dashed line positions 17'''',17'''' until each partition extends along a sidewall of the baling chamber.

In order to reinforce the plate-shaped compression member 8, the partitions 81 and 82 are provided with stiffening ridges 17 extending from the respective pivotal shafts 11 and 12 The inner ends of the ridges 17 of partition 81 are provided with pins 18 extending parallel to the pivotal shafts 11 and 12 and the inner ends of the ridges 17 of partition 82 are provided with elements 19 co-operating with the pins 18 and hooking around around the same. These coupling means 18 and 19 are disposed at a distance from the pressure face of the compression member 8 so that these coupling means absorb a tensile force during the densification of a bundle of crop.

Coupling and discoupling of the means 18 and 19 occur during the approaching pivotal movement and the parting pivotal movement at the beginning of the compression stroke and the return stroke respectively. This may be automatically performed by the guide means 20 and 21 respectively arranged in the upper side-wall 5''' of the baling chamber.

The guide means 20 and the roller 22 adapted to move along the former and fastened to a partition 81 and 82 respectively of the compression member are shown in detail in FIG. 8. The guide means 20 comprise mainly an appropriately shaped guide ridge having a different curvature for the partitions 81 and 82. The curvature of the guide means 20 is such that during the closing movements of the partitions 81 and 82 towards one another first partition 81 swings inwardly and subsequently partition 81 so that the hook 19 grips around the pin 18. The roller 22 travelling along the curved cam 20 is carried by a shaft S which retracted during the return stroke of the partitions 81 and 82 so that each roller 22 passes beneath its cam 20, after which the roller 22 is urged back into the starting position by the compression spring 23.

At the end of the compression stroke, after the removal of the compressed bale through the outlet port 10, and as a result of the initiation of return movement of the partitions 81 and 82, cams 21 in the upper sidewall 5''' of the baling chamber engage that the free edge of the upper stiffening ridge 17 of each partition 81 and 82 at respectively different radial distances from the pivotal shafts 11 and 12 so that the partition 81 is swung aside more rapidly than is the partition 82. The cams 21 are shown in detail in FIG. 9, from which it will be apparent that during the onward compression stroke of the compression member 8 the cams are automatically pushed away out of the baling chamber.

The delivery of a compressed bale of crop can be performed by means of a separate ejecting member 24, which is shown below in FIG. 5 and on the left-hand side in FIG. 4. The compression stroke of the compression member 8 is such that it extends up to the edge of the outlet port 10 facing the inlet port 9, so that together with the remaining part of the baling chamber a channel is formed, through which the ejecting member 24 can move, the compressed bale of crop being pushed away through the outlet port sideways out of the baling chamber during the movement to the right in FIG. 5.

The ejecting movement of the member 24 can again be performed by means of screw spindles 25 having screw elements 26 directly connected with the compression member 8. This connection can be established through slot-shaped openings extending towards the outlet port 10 in the bottom and top walls 5' and 5''' respectively. The screw spindles 25 are synchronously driven via the transmission gear 27 and the driving shaft 28 from the transmission gear 15 (see FIGS. 5 and 6).

In order to obtain pre-densification of the crop to be introduced into the baling chamber, the baling chamber shown in FIG. 1 is inclined so that crop conveyed by a pin up and elevator unit 29 via the inlet port 9 into the baling chamber 1 will automatically pass towards the outlet port 10 under the action of gravitation.

FIG. 2, on the contrary, shows auxiliary conveying means 30 and 30' in the bottom and top walls 5' and 5''' of the baling chamber whereas in FIG. 3, the conveying means 30'' is provided only in the top wall 5''' the baling chamber 1'' being, however, as shown in FIG. 1, slightly inclined downwards in the direction towards the outlet port 10. The crop pick-up mechanism may take various forms as indicated at 29' and 29" in FIGS. 2 and 13.

The auxiliary conveying means 30, 30' and 30" in the embodiments each are formed by a carrier in the form of an endless element, for example, a chain C passed around two reversing rollers, for example, sprocket wheels W, said carrier having catches P protruding into the interior of the baling chamber. The carrier is driven so that the catches protruding into the baling chamber move towards the outlet port 10. When the circumferential edge of the compression member 8 engages the inner wall of the baling chamber, the auxiliary conveying means have to be withdrawn as a whole out of the baling chamber, for which purpose slots are provided in the wall concerned of the baling chamber the dimensions of said slots being such that the carrier with the catches can be drawn to the outer side by means of a hinge structure. For the devices 30 and 30"; this pivotal structure comprises two parallel hinge arms A and A', the latter of which is prolonged, the prolongation being connected with a hydraulic cylinder H, which is a double-acting cylinder in the embodiment shown in FIG. 2 in order to produce an inward and an outward movement with respect to the baling chamber 1. In FIG. 3, the means 30" is likewise provided with two hinge arms A" and A''', the latter of which is prolonged and connected to the single-acting cylinder H', the inward movement of the auxiliary conveying member 30" into the baling space being produced by a weight 31.

The baler according to the invention may furthermore be provided with binding means so that subsequent to compressing the bale of crop can be surrounded by tape or the like and maintain its compressed shape. For this purpose the device shown in FIGS. 4 and 5 is provided with a tubular stud 32 forming a prolongation of the outlet port 10 and serving as a carrier for the binding means 33. The binding means 33 are preferably formed by an endless metal tapes slipped onto the tubular stub 32 and temporarily held in place by clamps 34. As soon as a compressed bale is pushed out of the tubular stub 32 by means of the ejecting member 24, a number of the endless tapes 33 can be sequentially pushed off the tubular stub 32 so that as the crop bale expands, it is automatically clamped tight in each endless tape.

In order to facilitate the loading of a supply of the endless elements 33 an auxiliary carrier may be employed in the form of a sleeve 35 fitting around the stub 32, the sleeve 35 with elements 33 thereon constituting an easily handled magazine.

In order to conduct the comparatively heavy bale of crop gradually away the tubular stub 32 is prolonged by a slide 36, the free end of which is supported by a skid 37. FIGS. 5 and 6 finally show a mechanism 38 for closing the outlet port 10. The closing mechanism comprises a tined grating TG slidable within the guide member GM between a retracted position clearing the opening 10 and a projected position extending across such opening as shown in FIG. 5. The mechanism for actuating the grating comprises the hydraulic cylinder assembly HC including the piston rod PR pivotally connected to the tined grating as shown.

It should finally be noted that the inlet port 9 is provided with a cutting edge 39, which co-operated with the lower edge of the compression member 8 so that stalks, stems or leaves are cut off when the compression member 8 brushes past the intlet port 9.

What is claimed is:

1. An agricultural baling machine comprising, in combination:
    an elongate frame assembly provided with ground-engaging wheels whereby the machine is movable over the ground, said frame assembly including a horizontally elongate baling chamber provided with an inlet port closely adjacent one end of the chamber and remote from the opposite end thereof and an end wall at said opposite end against which crop material is compressed;
    loading means attached to said frame assembly for picking up the crop to be baled and discharging it into the interior of said baling chamber through said inlet port toward said end wall;
    compressing means for periodically compressing the crop accumulated in said baling chamber, said compressing means comprising a compression member substantially filling the cross-sectional area of said baling chamber, and drive means for periodically moving said compression member in piston-like fashion between a normal position at said one end of the baling chamber and clearing said inlet port to that side remote fron said end wall and an extended position also clearing and leaving open said inlet port but to the opposite side thereof in closely spaced relation from said end wall whereby to form a compressed bale between said compression member and said end wall; and
    means for discharging said compressed bale from said chamber while said compression member is in said extended position.

2. A device as claimed in claim 1 characterized in that the inlet port provided in the sidewall of the baling chamber has a cutting edge at the rim nearest the outlet port, said cutting edge operating together with the edge of the compression member moving past the same as a pair of scissors.

3. A baling machine as defined in claim 1 including means mounting said compressing member for movement between a position substantially filling the cross-sectional area of the chamber and a position substantially opening the cross-sectional area of the chamber, and means for moving said compressing member to the latter position when the drive means operates to move the compressing member from its extended position to its normal position.

4. A baling machine as defined in claim 1 wherein said compression member comprises a pair of plates and said drive means includes a pair of upright spindles, one disposed adjacent each side of said baling chamber, one of said plates being pivotally carried by one of said spindles and the other of said plates being pivotally carried by the other of said spindles, means for interlocking said plates during the compressing stroke, and cam means for swinging said plates to positions adjacent the sides of the baling chamber during the return stroke.

5. A baling machine as defined in claim 4 including further cam means for closing said plates together at the beginning of the compressing stroke.

6. A baling machine as defined in claim 1 wherein said baling chamber is of rectangular cross section with the walls thereof presenting slots along the corner edges of the baling chamber, said drive means comprising a screw member adjacent each of said slots, a nut on each of said screw members and a spindle carried between each vertical pair of nuts.

7. A baling machine as defined in claim 6 wherein said compression member comprises a pair of plates, one pivotally carried by each spindle.

8. A baling machine as defined in claim 1 including conveying means projecting through said baling chamber between said inlet and outlet ports for packing crop toward said end wall.

9. A baling machine as defined in claim 8 including means for withdrawing said conveying means when said compressing means is actuated.

10. An agricultural baling machine comprising, in combination:

an elongate frame assembly provided with ground-engaging wheels whereby the machine is movable over the ground, said frame assembly including a horizontally elongate baling chamber provided with an inlet port adjacent one end, an end wall at its opposite end against which crop material is compressed and an outlet port at said opposite end which opens laterally and has one edge substantially aligned with said end wall;

loading means attached to said frame assembly for picking up the crop to be baled and discharging it into the interior of said baling chamber through said inlet port toward said outlet port;

compressing means for periodically compressing the crop accumulated in said baling chamber, said compressing means comprising a pair of plates forming a compression member substantially filling the cross-sectional area of said baling chamber, and drive means including a pair of upright spindles, one disposed adjacent each side of said baling chamber, one of said plates being pivotally carried by one of said spindles and the other of said plates being pivotally carried by the other of said spindles, for periodically moving said compression member in piston-like fashion from a normal position clearing said inlet port to an extended position at that edge of said outlet port opposite said edge which is substantially aligned with said end wall whereby to form a compressed bale between said compression member and said end wall, and means for interlocking said plates during the compressing stroke, and cam means for swinging said plates to positions adjacent the sides of the baling chamber thereby to return said member to said normal position thereof; and means for discharging said compressed bale through said outlet port each time said compression member is in said extended position.

11. A baling machine as defined in claim 10 including further cam means for closing said plates together at the beginning of the compressing stroke.

12. An agricultural baling machine comprising, in combination:

an elongate frame assembly provided with ground-engaging wheels whereby the machine is movable over the ground, said frame assembly including a horizontally elongate baling chamber of rectangular cross section with the walls thereof presenting slots along the corner edges of the baling chamber, said chamber having an inlet port adjacent one end, an end wall at its opposite end against which crop material is compressed and an outlet port at said opposite end which opens laterally and has one edge substantially aligned with said end wall;

loading means attached to said frame assembly for picking up the crop to be baled and discharging it into the interior of said baling chamber through said inlet port toward said outlet port;

compressing means for periodically compressing the crop accumulated in said baling chamber, said compressing means comprising a pair of plates forming a compression member substantially filling the cross-sectional area of said baling chamber, and drive means comprising a screw member adjacent each of said slots, a nut on each of said screw members and a spindle carried between each vertical pair of nuts, each one of said plates being pivotally carried by each spindle, said drive means periodically moving said compression member in piston-like fashion from a normal position clearing said inlet port to an extended position at that edge of said outlet port opposite said edge which is substantially aligned with said one wall whereby to form a compressed bale between said compression member and said end wall and then returning said member to said normal position thereof; and means for discharging said compressed bale through said outlet port each time said compression member is in said extended position.

13. An agricultural baling machine comprising, in combination:

an elongate frame assembly provided with ground-engaging wheels whereby the machine is movable over the ground, said frame assembly including a horizontally elongate baling chamber provided with an inlet port adjacent one end, an end wall at its opposite end against which crop material is compressed and an outlet port at said opposite end which opens laterally and has one edge substantially aligned with said end wall;

loading means attached to said frame assembly for picking up the crop to be baled and discharging it into the interior of said baling chamber through said inlet port toward said outlet port, said loading means including conveying means projecting through said baling chamber between said inlet and outlet ports for packing crop towards said outlet port;

compressing means for periodically compressing the crop accumulated in said baling chamber, said compressing means comprising a compression member substantially filling the cross-sectional area of said baling chamber, and drive means for periodically moving said compression member in piston-like fashion from a normal position clearing said inlet port to an extended position at that edge of said outlet port opposite said edge which is substantially aligned with said end wall and means for withdrawing said conveying means when said compressing means is actuated whereby to form a compressed bale between said compression member and said end wall and then returning said member to said normal position thereof; and means for discharging said compressed bale through said outlet port each time said compression member is in said extended position.

14. An agricultural baling machine comprising, in combination:

an elongate frame assembly provided with ground-engaging wheels whereby the machine is movable over the ground, said frame assembly including a horizontally elongate baling chamber provided with an inlet port closely adjacent one end and an end wall at its opposite end against which crop material is compressed, said baling chamber being of a length which is many times greater than the width of said inlet port;

loading means attached to said frame assembly for picking up the crop to be baled and continuously discharging it into the interior of said baling chamber through said inlet port toward said end wall;

compressing means for periodically compressing the crop accumulated in said baling chamber, said compressing means comprising a compression member substantially filling the cross-sectional area of said baling chamber and of a thickness less than said width of the inlet port, and drive means for periodically moving said compression member in piston-like fashion between a normal position clearing said inlet port to that side thereof opposite said end wall and an extended position also clearing said inlet port and closely spaced from said end wall whereby said compression member transiently sweeps past said inlet port in its movement between normal and extended position and forms a compressed bale between said compression member and said end wall when in said extended position while simultaneously defining an accumulation space behind said compression member into which said loading means continues to discharge; and means for discharging said compressed bale from said chamber when said compression member is in said extended position.

* * * * *